United States Patent [19]
Auerbach

[11] 3,836,766
[45] Sept. 17, 1974

[54] LIGHT FIXTURE
[76] Inventor: Seymour Auerbach, 1225 19th St. N.W., Washington, D.C. 20036
[22] Filed: Feb. 1, 1973
[21] Appl. No.: 328,622

[52] U.S. Cl. ..... 240/73 DA, 240/51.11 R, 240/52.1
[51] Int. Cl. .......... F21s 1/02, F21s 3/02, F21s 5/00
[58] Field of Search ........ 240/73 DA, 51.11 R, 52.1

[56] References Cited
UNITED STATES PATENTS
1,741,965   12/1929   Yates ............................ 240/73 DA
3,719,818   3/1973   Porter et al. ....................... 240/52.1

Primary Examiner—Samuel S. Matthews
Assistant Examiner—Richard A. Wintercorn
Attorney, Agent, or Firm—LeBlanc & Shur

[57] ABSTRACT
The light fixture includes a base secured either directly to the ceiling or wall surface about the opening to the junction box, i.e., independently of the junction box, or directly to the junction box. The base carries an element movable between a position overlying the junction box precluding access thereto and a position spaced from the junction box and providing access to the junction box. The element is preferably hinged to the base but may be otherwise connected thereto, i.e., by screwthreads, cams, snap fit, or the like whereby access to the junction box can be selectively obtained. The receptacle for the light source is carried by either the movable element or the base of the light fixture. By first securing the base to the ceiling or junction box and moving the element to the position providing access to the junction box, quick electrical connection can be effected without the need for simultaneously supporting the fixture while effecting the connection. Also, selective access to the junction box after the light fixture is installed is obtained.

30 Claims, 14 Drawing Figures

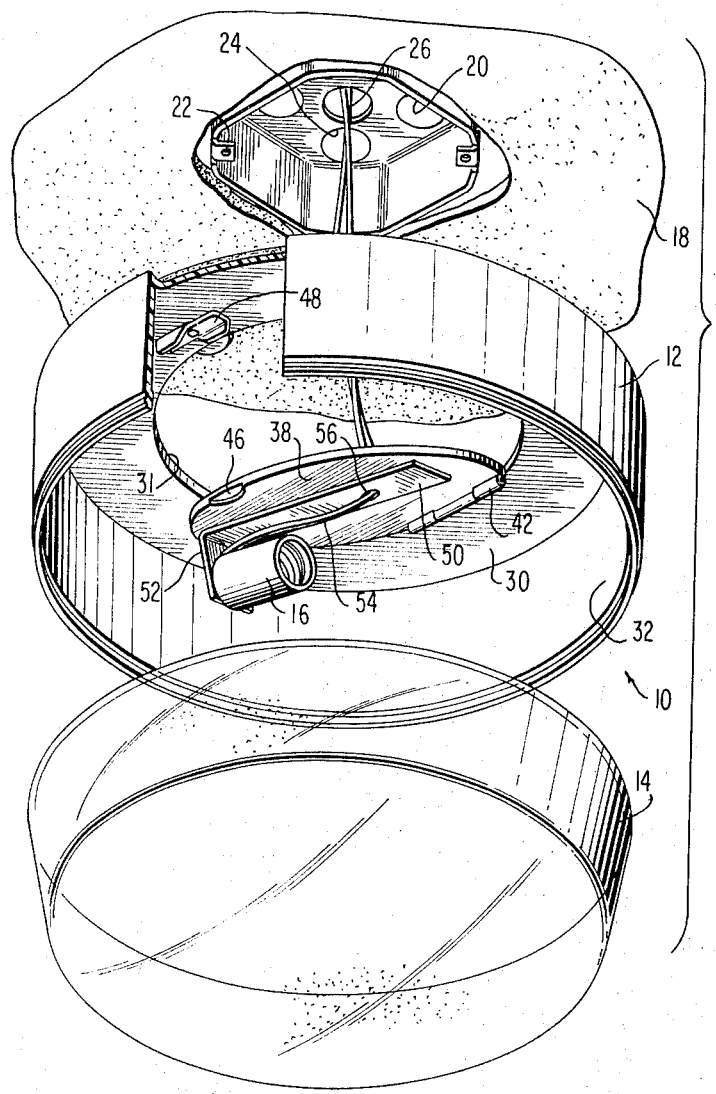
FIG. 1
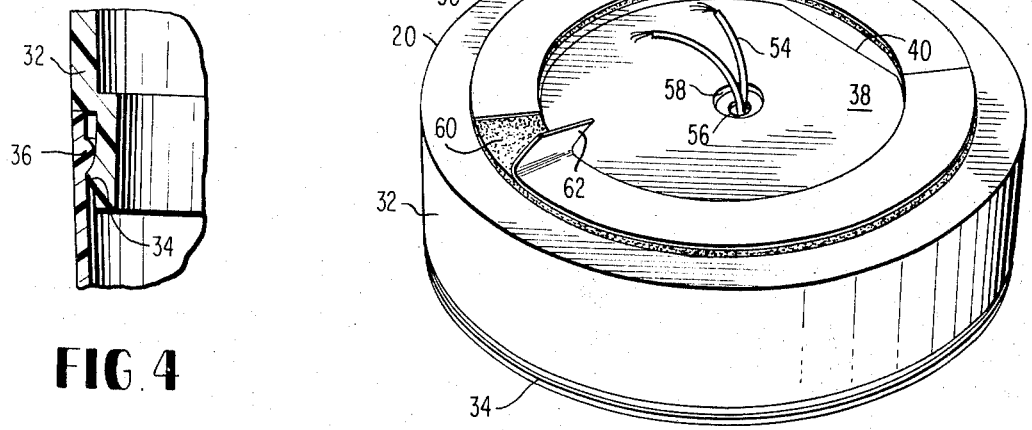
FIG. 4
FIG. 3

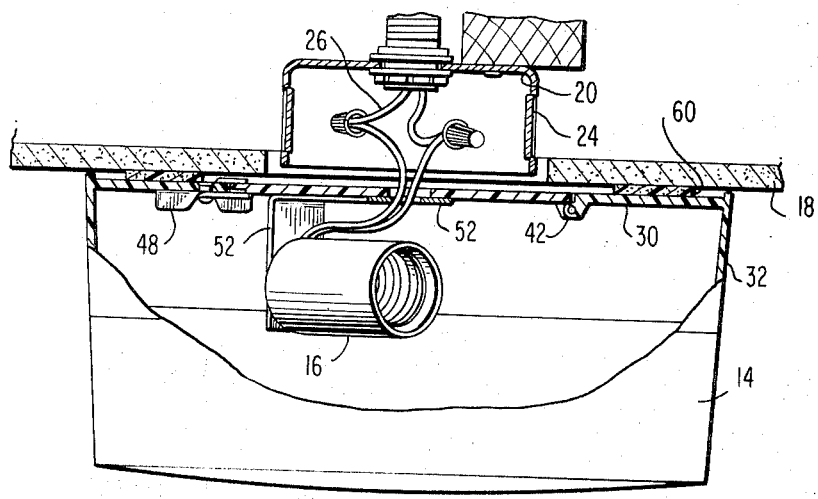
FIG. 2
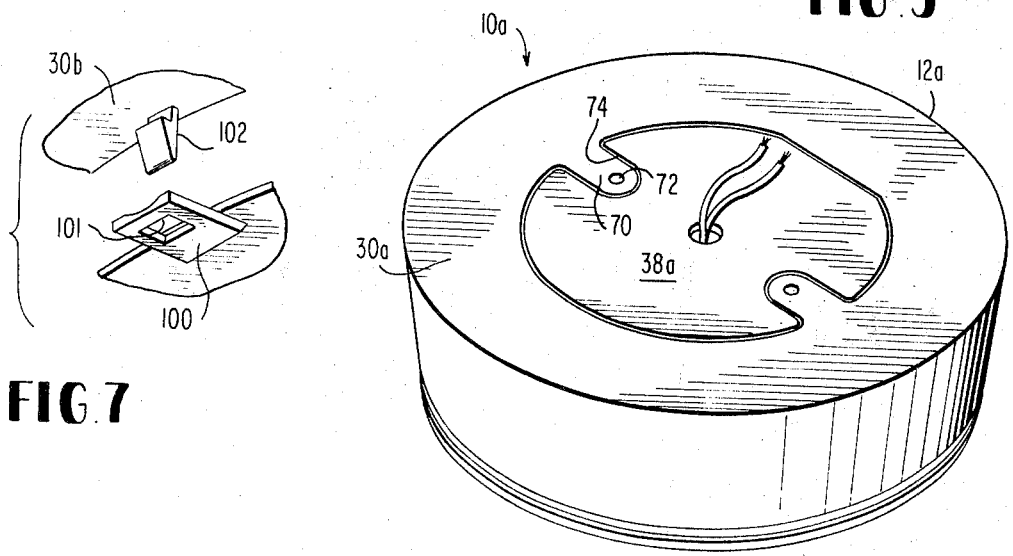
FIG. 5
FIG. 7
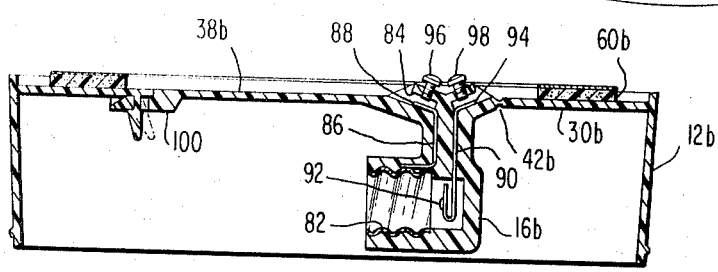
FIG. 6
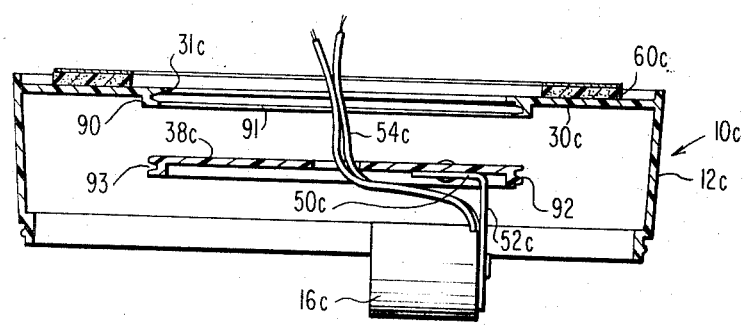
FIG. 8

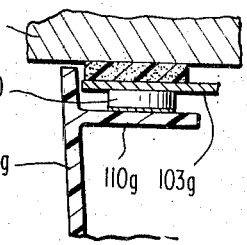
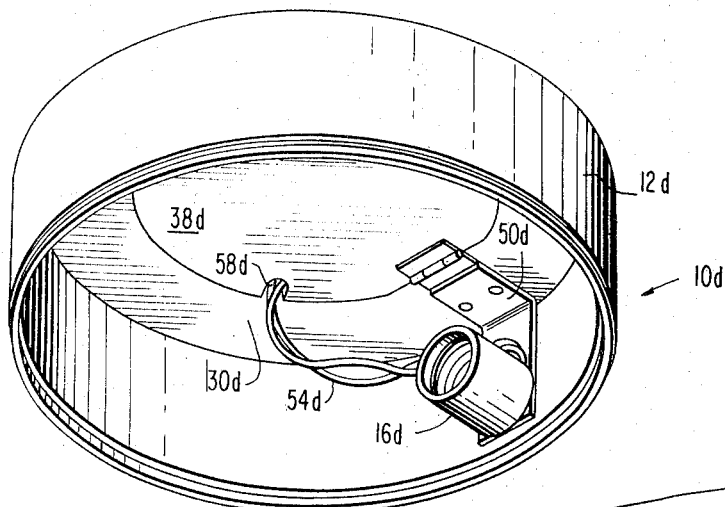
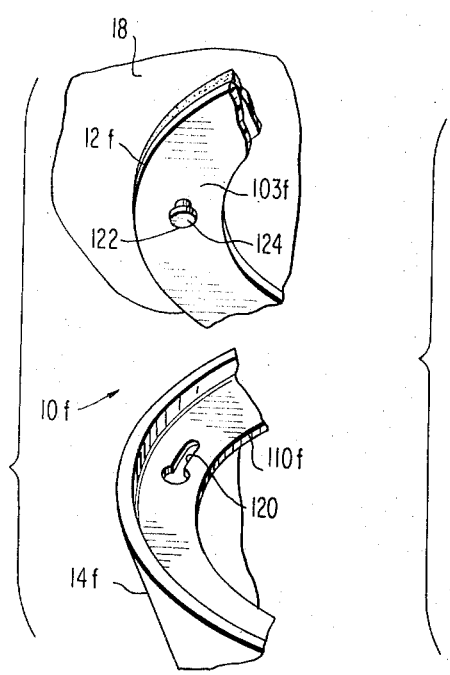
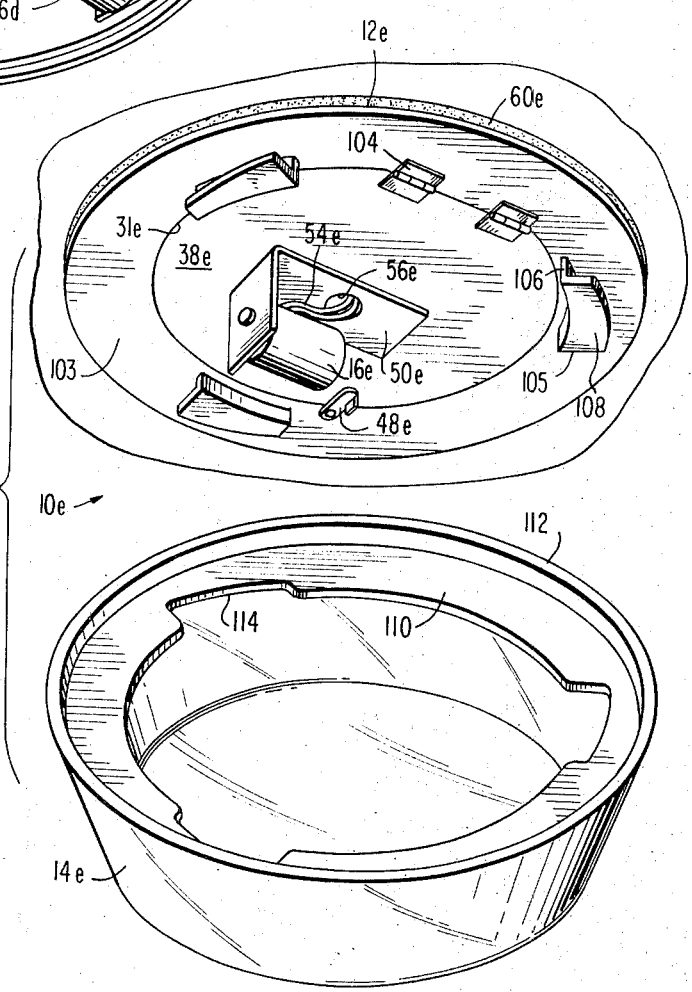

LIGHT FIXTURE

The present invention relates to a light fixture and particularly relates to an improved light fixture providing for quick electrical connection, ready installation, and accessibility to the junction box during and after installation.

Conventional light fixtures are very often cumbersome, difficult to install and usually require the services of an electrician. Particularly, conventional light fixtures are normally secured directly to a junction box located behind a ceiling or wall surface. Prior to securement of these conventional light fixtures to the junction box, the electrical wires of the light fixture must be electrically connected with the wires in the junction box. It is very often difficult for one man to balance the light fixture while simultaneously making the appropriate electrical connections. Also, most junction boxes and lighting fixtures are located in a ceiling and this increases the difficulty of installation particularly where cumbersome and/or heavy light fixtures are being installed. Further, in certain conventional light fixtures, the orientation of the junction box often determines the orientation of the light fixture per se. That is, junction boxes are normally provided with tabs for receiving screws or the like for joining the light fixture to the junction box. In non-symmetrical light fixtures, these tabs are very often misaligned relative to the desired orientation of the light fixture in a room. Consequently, initial improper installation or misalignment of the junction box prevents correct alignment and proper installation of the lighting fixture in a room. While some light fixtures have, in the past, been supported independently of the junction box, for example, see U.S. Pat. No. 2,578,022, none to applicant's knowledge have been supported independently of the junction box in a manner to provide ready access to the junction box through the fixture per se during and after installation of the light fixture.

The present invention provides a light fixture which eliminates and/or minimizes the foregoing and other problems associated with conventional light fixtures and provides a novel and improved light fixture having various advantages in construction, installation and use in comparison with such prior conventional light fixtures. Particularly, the present light fixture is comprised of a base which in one form can be secured directly to the ceiling or wall surface surrounding the opening to the junction box, i.e., independently of the junction box, or, in another form, can be secured directly to the junction box. In either form, the light fixture includes an element carried by the base thereof which is movable between a position overlying the opening in the ceiling or wall surface about the junction box whereby access to the junction box is prevented and a position spaced from the opening whereby access to the junction box can be obtained. The movable element permits access to the junction box during installation of the light fixture as well as thereafter. It is a particular feature of the present invention that the light fixture can thus be installed by first securing its base either to the ceiling or wall surface or to the junction box whereby the ceiling or junction box fully supports the light fixture while thereafter electrical connection between the light fixture and the wires in the junction box can be effected. More particularly, upon installation, the element is moved to expose the junction box through the opening in the base of the fixture whereby the wires from the electrical receptacle carried by the base can be connected to the electrical wires within the junction box. Thus, the light fixture need not be simultaneously supported by the installer or workman as the electrical connection is being made but rather both hands of the installer remain free to facilitate the electrical connection. Furthermore, even after long use of the fixture, the element can be moved to an open position at any time to expose the junction box for rewiring and the like.

A further feature of this invention resides in the ability to connect the light fixture directly to the ceiling or wall about the opening to the junction box independently of the junction box. This permits orientation of the light fixture without regard to the orientation of the junction box. This is particularly significant where the light fixture is not symmetrical and it is desired to mount the fixture in a predetermined orientation relative to the room.

Accordingly, it is a primary object of the present invention to provide a novel and improved light fixture which provides access to the junction box through the light fixture both during and after its installation.

It is another object of the present invention to provide a novel and improved light fixture which provides for ready, easy and quick electrical connection between the light fixture and the wires in the junction box.

It is still another object of the present invention to provide a novel and improved light fixture which can be secured to the ceiling or wall surrounding the junction box or to the junction box prior to effecting and thereby facilitating the electrical connection.

It is a further object of the present invention to provide a novel and improved light fixture having the foregoing characteristics and which fixture may be secured to the ceiling or wall surface about the junction box independently thereof.

It is a still further object of the present invention to provide a novel and improved light fixture having a flap providing for selective access to the junction box after installation.

These and further objects and advantages of the present invention will become more apparent upon reference to the following specification, appended claims and drawings wherein:

FIG. 1 is an exploded perspective view of a light fixture constructed in accordance with the present invention with parts broken out and in cross section for ease of illustration and also illustrating the access flap to the junction box in an open position;

FIG. 2 is a vertical cross-sectional view thereof illustrating the present light fixture applied to a ceiling or wall surface about an opening to the junction box and with the access flap to the junction box in a closed position;

FIG. 3 is a perspective view of the light fixture hereof as viewed from its backside;

FIG. 4 is an enlarged fragmentary cross-sectional view illustrating a pair of locking ribs for securing the diffuser to the base of the light fixture hereof;

FIG. 5 is a view similar to FIG. 3 illustrating a further form of light fixture hereof;

FIG. 6 is a vertical cross-sectional view illustrating a still further form of light fixture hereof;

FIG. 7 is an enlarged fragmentary perspective view of a mechanism for maintaining the access flap in a closed position;

FIG. 8 is a view similar to FIG. 6 and illustrating a further form of light fixture in accordance with the present invention;

FIG. 9 is a perspective view of a base for a light fixture constructed in accordance with still another form of the present invention;

FIG. 10 is an exploded perspective view illustrating a form of connection between a base and a diffuser in a still further form of the light fixture hereof;

FIG. 11 is a fragmentary perspective view similar to FIG. 10 illustrating a further form of connection between the base of the light fixture hereof and its diffuser;

FIG. 12 is a fragmentary enlarged cross-sectional view illustrating a still further form of connection between the base and diffuser in the light fixture hereof;

Figure 13:
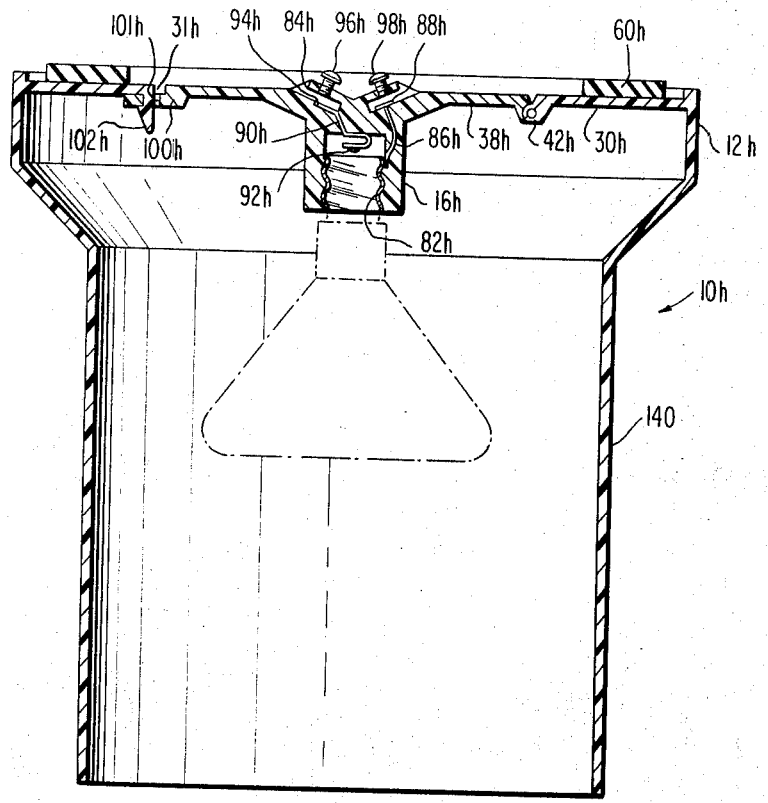
FIG. 13 is a cross-sectional view illustrating a further form of light fixture hereof.

Referring now to the drawings, and particularly to FIGS. 1–4, there is illustrated a light fixture generally indicated 10 constructed in accordance with the present invention and comprised of a base 12, a diffuser 14 and an electrical light receptacle 16, all adapted to overlie a wall or ceiling surface indicated 18 about a junction box 20 secured for example, to studs or rafters behind the wall or ceiling surface 18. The junction box 20 per se is conventional in construction, it being sufficient for present purposes to note that it carries a pair of inwardly extending tabs 22 having apertures therethrough and a plurality of circular weakened disc portions 24 which can be selectively punched out to receive electrical wires 26. In the form of light fixture illustrated in FIGS. 1–4, base 12 is comprised of an annular portion or rim 30 defining a central opening 31 and a skirt 32 projecting from the outer margin of rim 30. As best illustrated in FIG. 4, skirt 32 terminates in an outwardly projecting annular bead 34 which cooperates with an inwardly projecting annular bead 36 carried on diffuser 14.

Base 12 also includes an element which is movable between positions whereby selective access to the junction box through base 12 is provided. Particularly, this element comprises a flap 38 which is generally circular and coaxially located relative to rim 30. Flap 38 has a straight edge 40 which is hinged at 42 to the rim 30 surrounding flap 38. Hinge 42 may be a piano type hinge with coaxial eyelets on the rim and flap and a pin through the eyelets. In this form of light fixture, base 12 is preferably an integral plastic molding with the eyelets of the piano type hinge 42 between flap 38 and rim 30 being integrally molded. As best illustrated in FIGS. 1 and 2, flap 38 carries an indentation 45 along its outside surface at a location diametrically opposed to hinge 42. Rim 30 also pivotally carries a catch or latch 48. It will be appreciated that when flap 38 is pivoted to a position substantially coplanar with rim 30, catch 48 can be pivoted such that an end is received within indentation 46 whereby flap 38 is retained in generally coplanar relation with rim 30. By twisting catch 48 from its position and an end within indentation 46, flap 38 can be pivoted outwardly away from rim 30 to expose and provide access to the junction box 20 through the opening 31 in rim 30 as set forth more specifically hereinafter.

A bracket 50 is suitably secured to flap 38, for example, by rivets, not shown, and has a depending leg 52 on which is mounted the receptacle 16. The receptacle 16 is, per se, conventional in construction and, of course, receives the threaded base of a standard electrical light bulb. A pair of wires 54 are electrically connected to receptacle 16 and extend through an opening 56 in bracket 50 and a corresponding registering opening 58 in flap 38 for connection with the electrical wiring in junction box 20.

Diffuser 14 is generally cylindrical in shape and is formed of a translucent material. As noted previously, the upper edge of diffuser 14 carries an annular bead or rib 36 whereby the diffuser can be secured to the base 12 by a snap type fit.

It will be appreciated that the light fixture hereof can be provided in shapes other than the illustrated circular shape. For example, the light fixture can be square, rectangular, oval or provided in virtually any shape desired. In such other shapes, the light fixture may be provided with the illustrated generally circular flap irrespective of the shape of the base although it will be appreciated that the flap can also be formed to other shapes if necessary in accordance with the shape of the light fixture being provided. For example, where the elongated rectangular light fixture is provided, the flap may likewise have a rectangular configuration. This would be particularly advantageous, for example, in a fluorescent light fixture. Alternatively, the illustrated circular light fixture may have a flap which is square or rectangular in shape or otherwise as desired.

Referring now to FIGS. 2 and 3, the underside of rim 30 is preferably provided with an adhesive material 60. Prior to installation, a release paper 62 (FIG. 3) covers the adhesive material. In this form of light fixture, the adhesive is applied in the form of an annulus on the backside of rim 30 with the release paper 62 provided in a pair of semicircular sections to facilitate its removal from the adhesive upon installation of the light fixture. It will be appreciated that other types of securing means may be employed to secure the base to the wall or ceiling surface, for example, bolts, screws, or the like.

To install the light fixture illustrated in FIGS. 1–4, flap 38 is pivoted out of the plane of rim 30 whereby access through opening 31 in rim 30 and to the junction box 20 behind wall or ceiling surface 18 is provided. Release paper 62 is then removed from adhesive 60 and base 2 is placed about the junction box 20 with the latter exposed through opening 31 in rim 30. Base 12 is then pressed toward the wall or ceiling surface 18 and junction box 20 in registration one with the other. With flap 38 pivoted away from the junction box 20, i.e., out of the plane of rim 30, the electrical wires 54 connected to receptacle 16 and the electrical wires of the junction box can be readily connected one to the other in a conventional manner. Alternatively, wires 54 may carry a quick connector of the type commercially available whereby stripping the insulation from the wires is not required. It is an important feature hereof that the individual installing the light fixture need not support the light fixture while the electrical connection is effected. Rather the fixture is supported by the wall or ceiling surface when the electrical connection is made. After electrical connection is made, flap 38 is pivoted into generally coplanar relation with rim 30 and secured in such position by rotating an end of catch 48 within indentation 46. Diffuser 14 is then snap fitted about base 12 and the installation is complete.

It is a further important feature of this invention that access to junction box 20 can be obtained at any time after the light fixture is installed. To accomplish this, diffuser 14 is merely removed from base 12 and catch 48 is rotated to release flap 38. Flap 38 is thus pivotal out of the plane of rim 30 and access to junction box 20 is thereby obtained. It is a still further feature of this form of the invention that the light fixture per se is secured directly to the wall or ceiling surface surrounding the junction box independently of the junction box. This is particularly significant in non-symmetrically shaped light fixtures wherein such fixtures are customarily oriented in a particular manner relative to the surrounding room. Thus, irrespective of the position and location of the junction box 20, the light fixture 10 can be oriented as desired provided only that access through opening 31 in rim 30 to the junction box is obtained.

Referring now to FIG. 5, there is disclosed a further form of light fixture hereof which, instead of being directly secured to the wall or ceiling surface 18, is secured directly to the junction box 20. The light fixture 10a illustrated in FIG. 5 is identical in all respects with the previously described light fixture illustrated in FIGS. 1–4 except in certain particulars to effect direct connection thereof with junction box 20 as will now be described. In this form, the rim 30a is provided with a pair of diametrically opposed inwardly projecting ears 70, each of which is provided with an aperture 72. The flap 38a is pivoted to the base 12a as previously described. Rim 30a is provided, however, with recesses or cut-outs 74 complementary to ears 70 for receiving the latter when flap 38a lies in coplanar relation with rim 30a. Suitable screws or bolts, not shown, are provided to secure base 12a directly to the tabs 22 carried by junction box 20. That is, such screws or bolts are inserted through the registering apertures 72 of ears 70 and the apertures in tabs 22 whereby direct securement of light fixture 10a to junction box 20 is effected. With the flap 38a pivoted out of the plane of rim 30a, the electrical connections may be readily effected as previously described with respect to the fixture illustrated in FIGS. 1–4. A diffuser is applied to base 12a in like manner as previously described to complete the installation.

Referring now to FIGS. 6 and 7, there is illustrated a further form of light fixture hereof which is similar to the fixture illustrated in FIGS. 1–4 except for the flap 38b, the receptacle 16b and the latch for releasably securing the flap in coplanar relation with rim 30b of base 12b. In this form, flap 38b is provided with an integrally molded, laterally directed, light receptacle 16b. A metal, threaded, light socket 82 is integrally molded within receptacle 16b which, in turn, is integrally molded of plastic material as part of flap 38b. A pair of openings or recesses 84 are provided on the side of flap 38b remote from receptacle 16b. A lead wire or conductive metal strip 86 is electrically connected at one end of the metal socket 82 and extends through the plastic material terminating at its opposite end in electrical connection with a metallic clip 88. Clip 88 has a plurality of upstanding points or serrations. Similarly, a lead wire or conductive metal strip 90 is molded in the plastic material and terminates at one end in a contact 92 adjacent the inner end of socket 82 and at its other end in a clip 94 similar to clip 88. Screws 96 and 98 are threaded into the receptacle in opposition to clips 88 and 94, respectively, whereby unstripped electrical wires from the junction box can be inserted into respective recesses 84 with the electrical connection being made by threading the screws down onto the wires with the serrations or points penetrating the insulation about the wire and making electrical contact therewith. It will be appreciated that one or more additional pairs of similar connections may be electrically connected with lead wires 86 and 90 whereby wiring to other electrical devices on the same circuit may be effected. It will also be appreciated that other and known quick connectors may be utilized in lieu of the foregoing.

Flap 38b is also provided with a raised portion 100 diametrically opposed to hinge 42b. Raised portion 100 is provided with a slot 101 which receives a flexible pin 102 projecting from rim 30b. Pin 102 is receivable within slot 101 and has a lip which engages portion 100 to retain flap 38b in coplanar relation with rim 30b. By deflecting pin 102, the flap may be released for pivoting movement out of that plane. As in the prior embodiments, base 12b is secured to the wall or ceiling surface by an adhesive 60b or to the juncture box directly where rim 30b and flap 38b are provided with ears and recesses respectively similarly as illustrated in FIG. 5. In this form the hinge 42b is formed by decreasing the thickness of the plastic material along the hinge line relative to the thickness of rim 30b when the base 12b is initially molded. The flap 38b is thus readily pivotal about this reduced plastic hinge.

Referring now to FIG. 8, there is illustrated another form of light fixture 10C hereof which is substantially identical to the light fixture illustrated in FIGS. 1–4 with the exception that the element or flap 38c is secured to base 12c in a manner such that it is totally removable from base 12c. To accomplish this, annular portion 30c of base 12c is provided with a cylindrical rim 90 which projects outwardly of base 12c about opening 31c. Rim 90 is provided with a cam surface or partial screwthread 91 about its inner wall. A corresponding cam surface or partial screwthread 93 is provided about a rim 92 which projects outwardly along the outer margin of circular element 38c. Consequently, by rotating element 38c a quarter or half turn with the cam surfaces or screwthreads registering one with the other, element 38c may be releasably secured to base 12c. Element 38c carries a bracket 50c to which the receptacle 16c is secured. As in the previous forms, the base 12c is first secured to the wall or ceiling surface 18 about junction box 20 by adhesive 60c. The element 38c is thereafter brought up to the base 12c whereby the electrical wires 54c can be electrically connected with the wires in the junction box. Thereafter, the element 38c is rotated into final securement. It will be appreciated that receptacle 16c may be formed integrally with element 38c and have the electrical connections integrally molded therewith similarly as illustrated in FIG. 6.

In FIG. 9, there is disclosed a light fixture 10d including a base 12d and a flap 38d similar to the corresponding elements in the embodiment illustrated in FIGS. 1–4. In this form, however, the bracket 50d on which the electrical receptacle 16d is carried is secured to rim 30d by suitable rivets, screws, or the like, not shown. The flap 38d is pivotally mounted to rim 30 by a conventional piano type hinge which is suitably secured to flap 38d and rim 30d by rivets, screws or the like, also not shown. The wires 54d, which are electrically connected with the socket carried by receptacle 16d, extend from receptacle 16d through an opening 58d in flap 38d. This form of light fixture is installed similarly as described with respect to the light fixture illustrated in FIGS. 1–4. It will be appreciated that the receptacle 16 can be secured to the rims 30, 30a, 30b, and 30c in each of the embodiments illustrated in FIGS. 1– 4, 5, 6–7 and 8, respectively, in lieu of its securement to the corresponding element 38, 38a, 38b and 38c as illustrated.

FIGS. 10–12 disclose a form of light fixture hereof with different connections between the diffuser and the light fixture base being illustrated. In this form, base 12e comprises an annulus or ring 103 to which a flap 38e is pivotally secured by a pair of hinges 104. Flap 38e carries a bracket 50e on which the receptacle 16e is carried. The wires 54e extend from receptacle 16e through opening 56e in the bracket and an opening in flap 38e for connection with the wires in junction box 20. The reverse side of ring 103 is provided with an adhesive material 60e which is covered by release paper prior to installation. Depending from ring 103 is a plurality of L-shaped lugs 105 having vertically extending arcuate inner walls 106 and and outwardly projecting lower legs or wedge-like portions 108. These lugs are preferably formed integrally of plastic material with the ring 30e. The upper surfaces of the lugs are upwardly inclined and form cam surfaces. Ring 103 also carries a pivotal latch 48e for retaining flap 38e coplanar with ring 103.

The diffuser 14e comprises a generally cylindrical member having a closed or open lower end as desired, and an open upper end, the diffuser being formed of a translucent material. A radially inwardly extending flange 110 is provided and is spaced slightly inwardly of the edge or lip 112 of the diffuser. A plurality of openings or slots 114 are formed through flange 110 at circumferential positions thereabout corresponding to the circumferential positions of lugs 104 about ring 103.

To install the light fixture 10e, the release tape is removed from adhesive 60e and the ring 30e is adhesively secured to the ceiling or wall surface 18 surrounding the opening therethrough to junction box 20. With the flap 38e pivoted out of the plane of the ring 103, opening 31e exposes the junction box for access whereby wires 54e can be electrically connected with the electrical wires in junction box 20. After the electrical connection is effected, the flap can be closed to a coplanar position with ring 103 and the latch 48e pivoted to maintain flap 38e in such closed position. The diffuser 143 then located below support ring 100 with the lugs 105 lying in registry with the recesses 114 whereby movement of the diffuser toward the ring locates the lower legs 108 of the lugs within the diffuser below the flange 110. Rotation of the diffuser 14e causes the flange 110 to cam along the cammed surfaces of the lugs to form a friction fit with base 12e. The cooperation of the lugs on the ring 103 and recesses in the diffuser is more particularly described in my prior U.S. Pat. No. 3,524,981, the disclosure of which is incorporated herein by reference thereto as though fully set forth herein.

Referring now to FIG. 11, there is illustrated a portion of the light fixture 10f hereof, and specifically another form of connection between the diffuser and the base. In this form, the diffuser 14f is provided with inwardly directed flange 110f having key slots 120 circumferentially spaced thereabout. Base 12f comprises a ring 103f which carries a plurality of button type fasteners 122 each having an enlarged head 124. After ring 103f is secured to the wall or ceiling surface 18 about the junction box, diffuser 14f is located below ring 103f with the enlarged portions of key slots 120 in registry with the heads 124 of fasteners 122. Heads 124 of buttons 122 are received within the key slots upon movement of the diffuser toward the ring and diffuser 14f is then finally secured to base 12f by rotating diffuser 14f such that the heads 124 lie below the narrow portions of key slots 120. This type of securement between a base ring and a diffuser is more particularly described and illustrated in my prior U.S. Pat. No. 3,388,248, the disclosure of which is incorporated herein by reference thereto as though fully set forth herein.

Referring to FIG. 12, there is illustrated another form of securement between a diffuser 14a and base ring 103g in a light fixture hereof. In this form, diffuser 14g has an inwardly extending flange 110g on which is carried along its upper surface a sheet of magnetic material. Base ring 103g carries at spaced circumferential positions thereabout a plurality of magnets 130. After base ring 103g is adhesively or otherwise secured to the wall or ceiling surface 18 about the junction box and the electrical connections made as previously described, diffuser 14g is located such that magnets 130 carried by base ring 103g magnetically cooperate with the magnetic sheet material carried by the diffuser 14g to secure the diffuser 14g to its base 103g. It will be appreciated that the magnets can be fixed to the flange of the diffuser rather than to the base ring, with the latter carrying the magnetic material. This form of securement between a diffuser and a base ring is disclosed in my prior U.S. Pat. No. 3,593,021, the disclosure of which is incorporated herein by reference thereto as though fully set forth herein. It will be appreciated in the embodiments here illustrated in FIGS. 10–12, that the diffuser substantially surrounds and encompasses the base ring, whereby the base of the light fixture is substantially hidden from view and that this provides a decorative and aesthetically pleasing, as well as readily installed light fixture.

Referring now to the light fixture illustrated in FIG. 13, there is illustrated a still further form of light fixture 10h and which includes a base 12h including an annular rim 30h having adhesive material 60h applied thereabout similarly as previously described, whereby light fixture 10h may be secured to the wall or ceiling surface surrounding the junction box. The base 12h, in this form, is not provided with a diffuser, but rather is provided with an integrally molded extension or canopy which is preferably open at the end thereof remote from rim 30h, but which end may be closed by a grid or translucent material not shown.

As in prior embodiments hereof, a flap 38h is pivotally secured at 42h to the rim 30h and includes a raised element 100h having a slot 101h for receiving a downwardly projecting finger 102h integrally carried by the rim 30h similarly as illustrated in FIG. 7 whereby the flap 38h is movable between a position closing the opening 31h through base 12h and a position exposing the junction box behind the base 12h through the fixture 10h. In this form, flap 30h is provided with an integrally molded axially directed light receptacle 16h. Openings 84h are provided on the opposite side of flap 38h and an electrical wire 86h, connected at one end to a threaded metal socket 82h forming part of the receptacle 16h, extends through the plastic material to terminate in an electrical connection with a metallic clip 88h exposed in opening 84h. A lead wire or other electrically conductive material 90h is molded in the plastic material and terminates at one end in a contact 92h adjacent the inner end of socket 82h and at its other end in clip 94h similar to clip 88h. Screws 96h and 98h are threaded into the receptacle in opposition to clips 94h and 88h, respectively, whereby unstripped electrical wires from the junction box can be inserted into recesses 84h with the electrical connection being made by turning the screws down onto the wires with the serrations or points carried by the clips 94h and 88h penetrating the insulation about the wire and making electrical contact therewith.

Consequently, in this form the base 12h is secured to the wall or ceiling surface surrounding the junction box by removing the release tape applied to adhesive 60h and adhesively securing the fixture to the surface. The flap, without the electrical bulb illustrated by the dot-dash lines, can then be pivoted away from opening 31h whereby access to the junction box through opening 31h and through the canopy 140 is provided. Thus, the electrical connection in the recesses 84h can be readily effected and completed merely by pivoting flap 38h back to the illustrated position.

Figure 14:
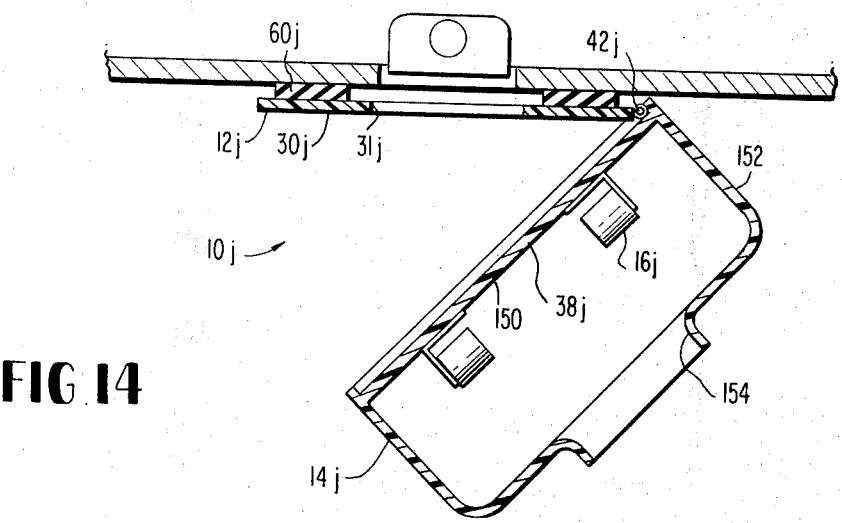
FIG. 14 is a vertical cross-sectional view illustrating a still further form of light fixture hereof.

Referring now to FIG. 14, there is disclosed a lighting fixture 10j having a base 12j and an element 38j which includes a diffuser 14j. The base 12j comprises an annular rim 30j having adhesive 60j on its underside whereby the base 12j is adhesively secured to the wall or ceiling surface 18 surrounding the junction box. The element 38j includes a flat surface 150 to which is secured by suitable brackets light receptacles 16j, the surface preferably carrying reflective material, not shown, on the same side thereof as the receptacles 16j. The diffuser 14j has a skirt 152 which terminates in an opening 154 opposite the central portion of the base surface 150, the diffuser and base surface being preferably integrally formed of a transluscent material. Electrical wires from the light receptacles 16j extend through the base surface 150 and terminate on the side thereof remote from receptacles 16j in appropriate leads for connection with the electrical wires of the junction box. The element 38j is pivotally secured to the base 12j at 42j. It will be appreciated that the element 38j is illustrated in a position pivoted away from base 12j whereby elements 38j are convenient for connection with the electrical wires in the junction box through the opening 31j in the base 12j. Thus, after the base 12j has been applied to the wall or ceiling surface, these electrical connections can be effected with the element 38j pivoted to the illustrated position. Thereafter, the element 38j can be pivoted such that its base surface 150 directly overlies the ring 30j. A suitable latch or other type of connection, for example, a snap fit, can be employed to maintain element 38j in such operable position.

Accordingly, it will be appreciated that the objects of the present invention are fully accomplished in the foregoing light fixtures in that in each embodiment hereof, access to the junction box, both during and after installation of the light fixture, is obtained. Moreover, the fixture can be first secured to the wall or ceiling surface around the junction box or to the junction box per se before the electrical connection is effected. Thus, the installer is not required to hold the light fixture while simultaneously attempting to effect the electrical connection. This obviously facilitates installation of the light fixture. Also, the junction box is readily exposed at any time for additional wiring work simply by moving the element away from the base of the light fixture.

It will be appreciated that one or more of the elements of each form of lighting fixture disclosed herein can be interchanged with the corresponding element or elements in one or more of the other forms of lighting fixture hereof. For example, either one of the integrally molded plastic receptacles 16b and 16h illustrated in FIGS. 6 and 13, respectively, could be utilized in the fixtures illustrated in FIGS. 1-4, 5, 8, 9, 10, 11, 12 or 14 in lieu of the receptacles specifically illustrated. Similarly, the various types of hinges and latches for the flaps can be interchanged as desired. Further, it will be appreciated that additional receptacles, either integrally molded or of the illustrated type, can be provided each fixture hwereby multiple light sources may be provided in any one fixture. Also, fluorescent type receptacles can be utilized in lieu of the illustrated incandescent type receptacles.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A light fixture adapted for electrical connection with electrical wiring in a junction box opening through a ceiling or wall surface comprising: a base having an opening therethrough, an electrical receptacle carried by said base and adapted to receive a light source, means carried by said base for securing the same in overlying relation relative to the junction box and the ceiling or wall surface about the junction box with the opening through said base in registry with the junction box through the ceiling or wall surface thereabout, means carried by said base providing for selective access through the opening in said base to the junction box when said base is secured in overlying relation relative to the junction box and to the ceiling or wall surface thereabout, said access means including a flap, means carried by said base for pivotally mounting said flap for movement between first and second positions, said flap in said first position closing the opening through said base to preclude access to the junction box through said opening, said flap in said second position being spaced from the opening through said base whereby access to the junction box through the opening is provided, and means cooperable with said base for retaining said flap in said first position, said base including a rim about said flap, said receptacle being carried by said rim.

2. A light fixture adapted for electrical connection with electrical wiring in a junction box opening through a ceiling or a wall surface comprising: a base having an opening therethrough, an electrical receptacle carried by said base and adapted to receive a light source, means carried by said base for securing the same in overlying relation relative to the junction box and the ceiling or wall surface about the junction box with the opening through said base in registry with the junction box through the ceiling or wall surface thereabout, means carried by said base providing for selective access through the opening in said base to the junction box when said base is secured in overlying relation relative to the junction box and to the ceiling or wall surface thereabout, said base projecting outwardly of the ceiling or wall surface, a diffuser, and means for releasably securing said diffuser and said base one to the other, said diffuser having a portion extending about the perimeter of said base whereby said diffuser surrounds said base when secured thereto to block the latter from view exteriorly of the light fixture.

3. A light fixture according to claim 2 wherein the means for securing the base and diffuser one to the other includes a cam surface carried by one of said base and said diffuser and a cam follower carried by the other of said base and said diffuser.

4. A light fixture according to claim 2 wherein the means for securing the base and diffuser one to the other includes a key slot carried by one of said base and said diffuser, and a pin carried by the other of said base and said diffuser and engageable within said key slot.

5. A light fixture according to claim 2 wherein the means for securing the base and diffuser one to the other includes cooperative magnetic securing means carried by said base and said diffuser.

6. A light fixture comprising: a junction box opening through a ceiling or wall surface, a base having an opening therethrough, an electrical receptacle carried by said base and adapted to receive a light source, means carried by said base for directly connecting said base and said junction box one to the other with said base in overlying relation relative to the junction box and the ceiling or wall surface about said junction box, the opening through said base lying in registry with said junction box through the ceiling or wall surface thereabout, and means carried by said base providing for selective access through the opening in said base to said junction box when said base is secured to said junction box in overlying relation thereto and to the ceiling or wall surface thereabout.

7. A light fixture adapted for electrical connection with electrical wiring in a junction box opening through a ceiling or wall surface comprising: a base having an opening therethrough, an electrical receptacle carried by said base and adapted to receive a light source, means carried by said base for securing the same in overlying relation relative to the junction box and the ceiling or wall surface about the junction box with the opening through said base in registry with the junction box through the ceiling or wall surface thereabout, means carried by said base providing for selective access through the opening in said base to the junction box when said base is secured in overlying relation relative to the junction box and to the ceiling or wall surface thereabout, said access means including an element selectively movable between first and second positions, said element in said first position closing the opening through said base to preclude access to the junction box through said opening, said element in said second position being spaced from the opening through said base whereby access to the junction box through said opening is provided, said receptacle being carried by said element on the side thereof remote from the junction box when said element lies in said first position, and electrical wires extending from said receptacle through said element to terminate on the opposite side thereof from said receptacle whereby said wires are adapted for ready connection to the electrical wiring in the junction box when said element lies in said second position.

8. A light fixture according to claim 7 wherein said base, said element and said receptacle are integrally molded of a plastic material.

9. A light fixture adapted for electrical connection with electrical wiring in a junction box opening through a ceiling or wall surface comprising: a base having an opening therethrough, an electrical receptacle carried by said base and adapted to receive a light source, means carried by said base for securing the same in overlying relation relative to the junction box and the ceiling or wall surface about the junction box with the opening through said base in registry with the junction box through the ceiling or wall surface thereabout, means carried by said base providing for selective access through the opening in said base to the junction box when said base is secured in overlying relation relative to the junction box and to the ceiling or wall surface thereabout, said access means including an element selectively movable between first and second positions, said element in said first position closing the opening through said base to preclude access to the junction box through said opening, said element in said second position being spaced from the opening through said base whereby access to the junction box through said opening is provided, a diffuser, and means for releasably securing said diffuser to said base.

10. A light fixture adapted for electrical connection with electrical wiring in a junction box opening through a ceiling or wall surface comprising: a base having an opening therethrough, an electrical receptacle carried by said base and adapted to receive a light source, means carried by said base for securing the same in overlying relation relative to the junction box and the ceiling or wall surface about the junction box with the opening through said base in registry with the junction box through the ceiling or wall surface thereabout, means carried by said base providing for selective access through the opening in said base to the junction box when said base is secured in overlying relation relative to the junction box and to the ceiling or wall surface thereabout, at least a portion of said base and said receptacle being integrally molded of plastic material, said receptacle including a pair of electrical contacts for electrical connection with the light source and electrically conductive means connected to said contacts and extending through said receptacle to terminate on the side of said base remote from said receptacle for electrical connection with the electrical wiring in the junction box.

11. A light fixture according to claim 10 wherein said electrically conductive means terminates on the backside of said base in a pair of contacts, and means carried by said base for effecting electrical connection between said latter mentioned contacts and the electrical wiring in the junction box.

12. A light fixture adapted for electrical connection with electrical wiring in a junction box opening through a ceiling or wall surface comprising: a base having an opening therethrough, an electrical receptacle carried by said base on the side thereof remote from the junction box, said electrical receptacle being adapted to receive a light source, means carried by said base for securing the same in overlying relation relative to the junction box and to the ceiling or wall surface about the junction box with the opening through said base in registry with the junction box through the ceiling or wall surface thereabout, means carried by said base providing for selective access through the opening in said base to the junction box when said base is secured in overlying relation relative to the junction box and to the ceiling or wall surface thereabout, and electrical conductive means extending from said receptacle to terminate on the side of said base remote from said receptacle for electrical connection with the electrical wiring in the junction box.

13. A light fixture according to claim 12 wherein said access means includes an element selectively movable between first and second positions, said element in said first position closing the opening through said base to preclude access to the junction box through said opening, said element in said second position being spaced from the opening through said base whereby access to the junction box through said opening is provided.

14. A light fixture according to claim 13 wherein said receptacle is carried by said element and movable therewith between said first and second positions.

15. A light fixture according to claim 13 wherein said element comprises a flap, and means carried by said base for pivotally mounting said flap for movement between said first and second positions, and means cooperable with said base for retaining said flap in said first position.

16. A light fixture according to claim 15 wherein said receptacle is carried by said flap and pivotal therewith between said first and second positions.

17. A light fixture according to claim 16 wherein said base and said flap are integrally molded of a plastic material, said flap being pivotally connected to said base by said plastic material.

18. A light fixture according to claim 13 wherein said element comprises a part releasably attachable to said base, said part in said second position thereof being disconnected from said base.

19. A light fixture according to claim 18 wherein said receptacle is carried by said part.

20. A light fixture according to claim 12 in combination with said wall or ceiling surface, said securing means directly connecting said base and said ceiling or wall surface one to the other.

21. A light fixture according to claim 12 wherein at least a portion of said base is integrally molded of plastic material and carries a pair of contacts in electrical connection with said electrical conductive means, and means carried by said base for effecting electrical connection between said contacts and the electrical wiring in the junction box.

22. A light fixture according to claim 12 wherein said base projects outwardly of the ceiling or wall surface, a diffuser, means for releasably securing said diffuser and said base one to the other, said diffuser having a portion extending about the perimeter of said base whereby said diffuser surrounds said base when secured thereto to substantially block the latter from view exteriorly of the light fixture.

23. A light fixture according to claim 12 wherein said access means includes an element selectively movable between first and second positions, said element in said first position closing the opening through said base to preclude access to the junction box through said opening, said element in said second position being spaced from the opening through said base whereby access to the junction box through said opening is provided, said receptacle being carried by said element on the side thereof remote from the junction box when said element lies in said first position, said electrical conductive means extending from said receptacle through said element to terminate on the opposite side thereof from said receptacle for electrical connection with the electrical wiring in the junction box when said element lies in said second position.

24. A light fixture according to claim 23 wherein said element comprises a flap, and means carried by said base for pivotally mounting said flap for movement between said first and second positions, and means cooperable with said base for retaining said flap in said first position.

25. A light fixture according to claim 23 in combination with said junction box and said wall or ceiling surface, said securing means directly connecting said base and said ceiling or wall surface one to the other.

26. A light fixture according to claim 23 in combination with said junction box and said wall or ceiling surface, said securing means directly connecting said base and said junction box one to the other.

27. A light fixture according to claim 9 wherein said base projects outwardly of the ceiling or wall surface, said diffuser having a portion extending about the perimeter of said base whereby said diffuser surrounds said base when secured thereto to substantially block the latter from view exteriorly of the light fixture.

28. A light fixture according to claim 9 wherein said receptacle is carried by said element on the side thereof remote from the junction box when said element lies in said first position, and electrical conductive means extending from said receptacle through said element to terminate on the opposite side thereof from said receptacle for connection to the electrical wiring in the junction box when said element lies in said second position.

29. A light fixture according to claim 28 in combination with said junction box and said wall or said ceiling surface, said securing means directly connecting said base and said ceiling or said wall surface one to the other.

30. A light fixture according to claim 28 in combination with said junction box and said wall or ceiling surface, said securing means directly connecting said base and said junction box one to the other.

* * * * *

UNITED STATES PATENT OFFICE
CERTIFICATE OF CORRECTION

Patent No. 3,836,766                    Dated September 17, 1974

Inventor(s) Seymour Auerbach

It is certified that error appears in the above-identified patent and that said Letters Patent are hereby corrected as shown below:

Column 3, line 58, "45" should read --46--.

Column 3, line 66, "and an" should read --with an--.

Column 4, line 53, "base 2" should read --base 12--.

Signed and sealed this 31st day of December 1974.

(SEAL)
Attest:

McCOY M. GIBSON JR.                C. MARSHALL DANN
Attesting Officer                  Commissioner of Patents